(12) United States Patent
Hayashi et al.

(10) Patent No.: US 11,417,947 B2
(45) Date of Patent: Aug. 16, 2022

(54) ANTENNA DEVICE FOR VEHICLE

(71) Applicant: YOKOWO CO., LTD., Tokyo (JP)

(72) Inventors: Kentaro Hayashi, Tomioka (JP); Toshihiko Fujii, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 7 days.

(21) Appl. No.: 17/047,692

(22) PCT Filed: Apr. 11, 2019

(86) PCT No.: PCT/JP2019/015733
§ 371 (c)(1),
(2) Date: Oct. 15, 2020

(87) PCT Pub. No.: WO2019/208231
PCT Pub. Date: Oct. 31, 2019

(65) Prior Publication Data
US 2021/0167489 A1    Jun. 3, 2021

(30) Foreign Application Priority Data

Apr. 27, 2018  (JP) .............................. JP2018-086169

(51) Int. Cl.
| | |
|---|---|
| *H01Q 1/32* | (2006.01) |
| *H01Q 1/24* | (2006.01) |
| *H01Q 1/38* | (2006.01) |
| *H01Q 1/42* | (2006.01) |

(52) U.S. Cl.
CPC .......... *H01Q 1/3275* (2013.01); *H01Q 1/241* (2013.01); *H01Q 1/38* (2013.01); *H01Q 1/42* (2013.01)

(58) Field of Classification Search
CPC ........ H01Q 1/3275; H01Q 1/241; H01Q 1/38; H01Q 1/42; H01Q 1/1214; H01Q 1/32; H01Q 1/22; H01Q 1/48; B60R 11/02
See application file for complete search history.

(56) References Cited

U.S. PATENT DOCUMENTS

| | | | |
|---|---|---|---|
| 2012/0274519 A1* | 11/2012 | Chakam | H01Q 1/3275 343/702 |
| 2017/0214130 A1* | 7/2017 | Grimes | H01Q 1/1214 |
| 2019/0237866 A1* | 8/2019 | Kiyokawa | H01Q 5/307 |

FOREIGN PATENT DOCUMENTS

| | | |
|---|---|---|
| JP | 2016-116048 A | 6/2016 |
| KR | 10-2010-0137883 A | 12/2010 |
| WO | 2017/046972 A1 | 3/2017 |
| WO | 2018/074215 A1 | 4/2018 |

OTHER PUBLICATIONS

International Search Report and Written Opinion dated Jun. 11, 2019 for PCT/JP2019/015733 filed on Apr. 11, 2019, 6 pages with English translation of International Search Report.

* cited by examiner

*Primary Examiner* — David E Lotter
(74) *Attorney, Agent, or Firm* — Xsensus LLP

(57) ABSTRACT

An antenna device for a vehicle includes a camera that facilitates assembly. The antenna device for a vehicle includes: an antenna case that has a housing space formed therein; an antenna base that is covered with the antenna case from above to form the housing space; an antenna element that is held by the antenna base and housed in the housing space; and a camera that is housed in the housing space The antenna base has a wall portion extending upward. The camera is fixed to the wall portion.

2 Claims, 11 Drawing Sheets

ANTENNA DEVICE FOR VEHICLE

CROSS-REFERENCE TO RELATED APPLICATIONS

The present application is based on PCT filing PCT/JP2019/015733, filed Apr. 11, 2019, which claims priority to JP 2018-086169, filed Apr. 27, 2018, the entire contents of each are incorporated herein by reference.

TECHNICAL FIELD

The present invention relates to an antenna device for a vehicle including a camera.

BACKGROUND ART

Conventionally, as in Patent Literature 1, an antenna device for a vehicle including a camera has been proposed.

CITATION LIST

Patent Literature

Patent Literature 1: JP 2016-116048 A

SUMMARY OF INVENTION

Technical Problem

However, when the camera is to be attached to a member different from an antenna base such as an inner case, assembly has not been easy. Assembly has been performed as follows, for example. With a camera cable passed through a base opening, the antenna base is covered with the inner case, so that the camera cable extends from a camera mounting opening to the outside of the inner case. Then, after connecting the camera cable to a camera, the camera cable extending from the base opening is pulled toward the base opening side to fix the camera to the inner case.

Accordingly, it is an object of the present invention to provide an antenna device for a vehicle including a camera that facilitates assembly.

Solution to Problem

An antenna device for a vehicle according to the present invention includes: an antenna case that has a housing space formed therein; an antenna base that is covered with the antenna case from above to form the housing space; an antenna element that is held by the antenna base and housed in the housing space; and a camera that is housed in the housing space. The antenna base has a wall portion extending upward, and the camera is fixed to the wall portion.

The camera is fixed to the antenna base.

At this time, there is no need to wire a camera cable between a member different from the antenna base and the antenna base.

For this reason, as compared with a form in which the camera is fixed to a member different from the antenna base, wiring work of the camera cable can be simplified, for example, and assembly of the antenna device for the vehicle can be facilitated.

Additionally, the camera is attached to a region (wall portion) of the antenna base which is raised upward.

For this reason, as compared with a form in which the camera is attached to a flat shape portion of the antenna base, assembly of the antenna device for the vehicle can be facilitated.

Preferably, the antenna device for the vehicle further includes an inner case that is arranged in the housing space and forms an internal space with the antenna base, the antenna element arranged in the internal space.

The antenna base and the inner case can waterproof the antenna element and other components housed therein.

Additionally, preferably, the wall portion has a height that decreases in a slope shape in a direction from the camera toward the wall portion.

In a form in which the force applied to an inner pad is not uniform, such as when an upper portion of the wall portion has a stepped shape, water easily enters a portion where the force applied to the inner pad is weak.

Since the wall portion has the slope shape, the force applied to the inner pad in the direction perpendicular to the surface formed by the inner pad is substantially the same everywhere on the inner pad.

Hence, the waterproofing property can be enhanced as compared with a form in which the upper portion of the wall portion does not have a slope shape.

More preferably, the antenna device for the vehicle further includes an inner case that is arranged in the housing space and covers the wall portion from above to form an internal space, the antenna element arranged in the internal space.

Additionally, preferably, the antenna device for the vehicle further includes an inner case that is arranged in the housing space and forms an internal space with the antenna base. At least a part of a lens that covers an opening of the inner case and guides external light to an imaging area of the camera, or a lens cover that protects the lens maintain watertightness with the inner case.

The inner case covers the camera and other components while waterproofing with the lens or the lens cover.

As a result, as compared with a form in which the inner case does not cover the camera but covers the antenna element and other components, it is possible to increase the length of the inner case.

Hence, it is possible to increase the degree of freedom in arranging the antenna element inside the inner case.

Advantageous Effect of Invention

As described above, according to the present invention, it is possible to provide an antenna device for a vehicle including a camera that facilitates assembly.

DESCRIPTION OF EMBODIMENTS

Hereinafter, an antenna device for a vehicle according to the present embodiment will be described with reference to the drawings.

Note that the embodiment is not limited to the following embodiments. Additionally, the content described in one embodiment is similarly applied to other embodiments in principle. Additionally, the embodiments and modifications can be appropriately combined.

First Embodiment

A first antenna device 1 for a vehicle according to a first embodiment is attached to an upper surface of a vehicle such as a roof 100.

Figure 1:
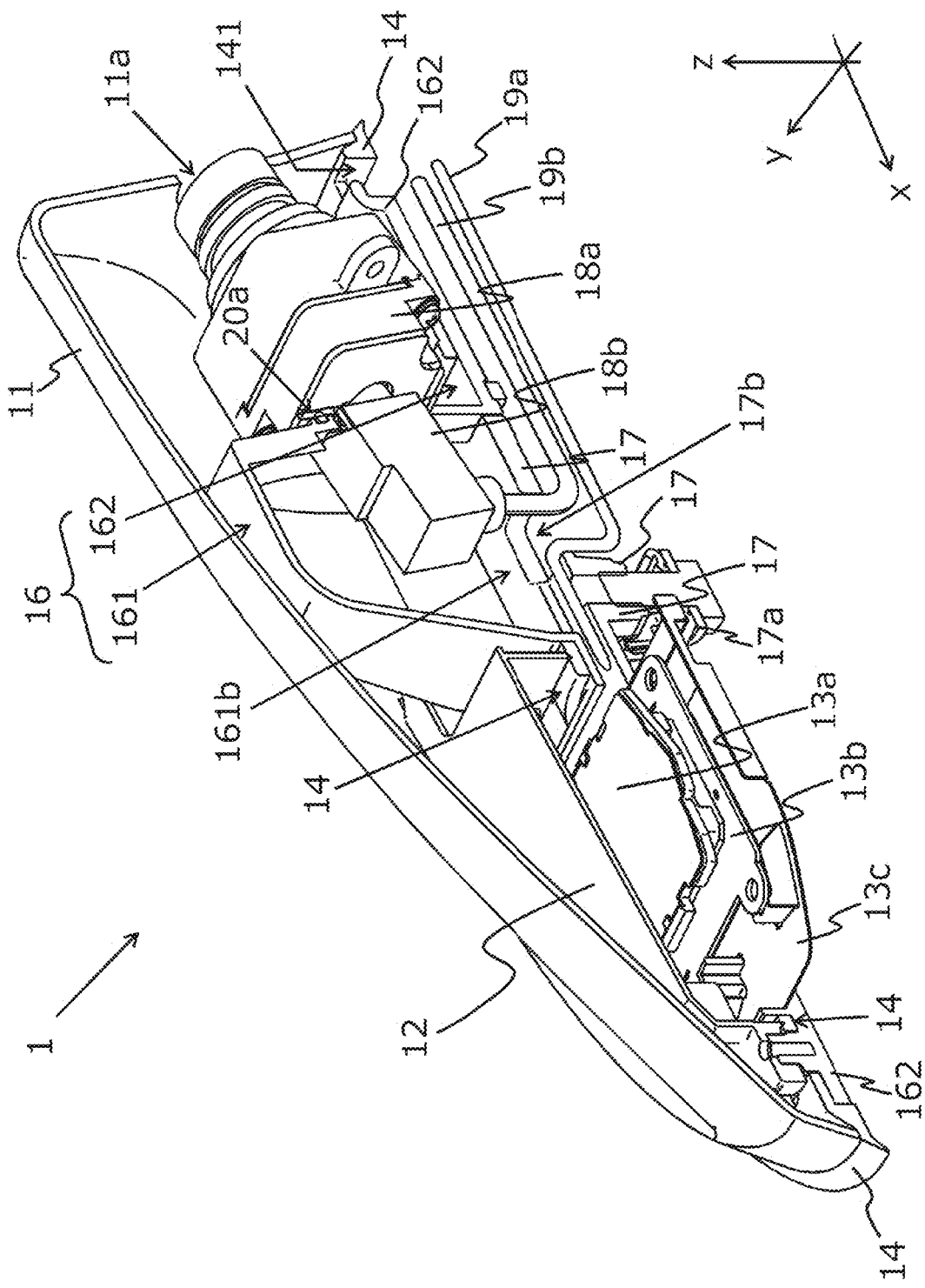
FIG. 1 is a cross-sectional perspective view of an antenna device for a vehicle according to a first embodiment.
Figure 2:
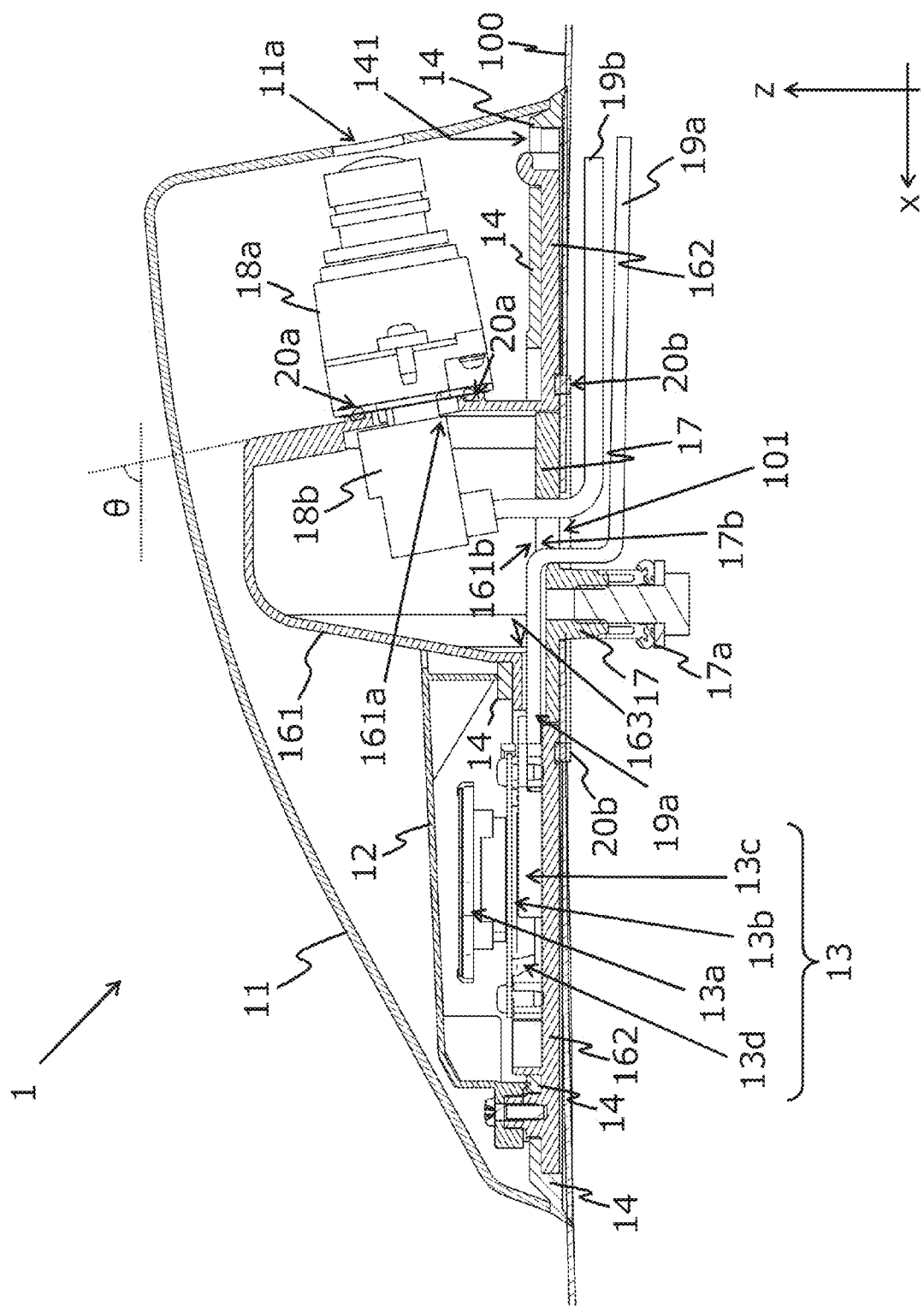
FIG. 2 is a cross-sectional configuration diagram of the antenna device for the vehicle according to the first embodiment.
Figure 3:
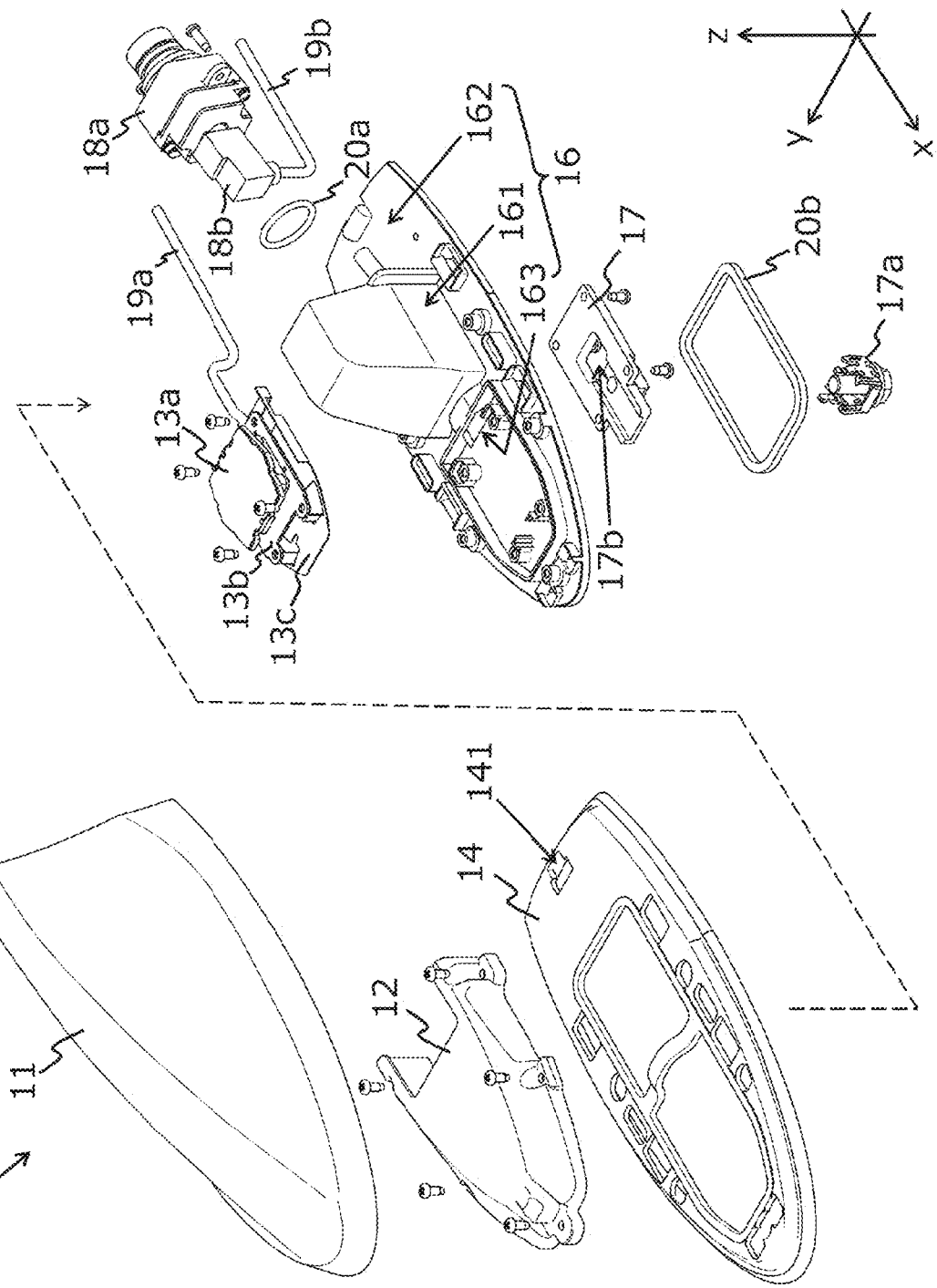
FIG. 3 is an exploded perspective view of the antenna device for the vehicle according to the first embodiment.

For example, as shown in FIGS. 1 to 3, the first antenna device 1 for the vehicle includes a first antenna case 11, a first inner case 12, a first antenna unit 13, a first pad 14, a first resin base 16, a first metal base 17, a first camera 18a, a first connector 18b, a first antenna cable 19a, a first camera cable 19b, a first seal member 20a, and a first waterproof seal 20b.

Note that the first antenna device 1 for the vehicle is an example of an antenna device for a vehicle. The first antenna case 11 is an example of an antenna case. The first inner case 12 is an example of an inner case. The first antenna unit 13 is an example of an antenna unit. The first pad 14 is an example of a pad. The first resin base 16 is an example of a resin base. The first metal base 17 is an example of a metal base. The first camera 18a is an example of a camera. The first connector 18b is an example of a connector. The first antenna cable 19a is an example of an antenna cable. The first camera cable 19b is an example of a camera cable. The first seal member 20a is an example of a seal member. The first waterproof seal 20b is an example of a waterproof seal.

In order to describe the directions, it is assumed that the front-rear direction of the vehicle to which the first antenna device 1 for the vehicle is attached is direction x, a direction that is perpendicular to direction x and is the left-right direction of the vehicle is direction y, and a substantially vertical direction that is perpendicular to direction x and direction y is direction z.

In FIG. 1, directions indicated by arrows on the xyz axes are defined as the forward direction, the right direction, and the upward direction, respectively.

The first antenna case 11 is made of synthetic resin having radio wave transparency. The first antenna case 11 has a shark fin shape which is inclined, so that the front side in direction x is lower than the rear side in direction x and has both side surfaces curved inward, for example.

The first antenna case 11 has an open lower surface and has a housing space formed therein. The first antenna case 11 covers the first inner case 12 and other components.

For example, the first inner case 12, the first antenna unit 13, and the first camera 18a are housed in the housing space formed by covering the first resin base 16 with the first antenna case 11.

A first camera opening 11a is provided at the rear of the first antenna case 11 in direction x and in a region facing a lens of the later-described first camera 18a and facing the vicinity thereof.

The first camera opening 11a is provided on the yz plane that passes through the substantial center in the left-right direction at the rear of the first antenna case 11 in direction x.

Note that the first embodiment shows an example in which the first antenna case 11 is formed separately from the roof 100 of the vehicle. However, a part of the roof 100 of the vehicle may bulge upward in direction z to form the first antenna case 11.

The first inner case 12 is made of synthetic resin having radio wave transparency. The first inner case 12 has an open lower surface and covers a later-described first antenna element 13a and other components.

For example, the first antenna unit 13 is arranged in an internal space formed by the first inner case 12 and the first resin base 16 (first flat surface portion 162).

The first antenna unit 13 has the first antenna element 13a, a first antenna substrate 13b, a first ground plate 13c, and a first shield cover 13d.

The first antenna element 13a is a flat panel antenna for receiving satellite broadcasting, or a flat panel antenna for receiving position information (time information) from a satellite such as GPS. The first antenna element 13a is attached to the first antenna substrate 13b.

Note that the first antenna element 13a may be configured by a flat panel antenna for receiving satellite broadcasting or the like. However, the first antenna element 13a may be configured by an upper element such as a capacitance loading element and a lower element such as a wavelength shortening element for receiving AM/FM broadcasting. Additionally, the first antenna element 13a may be configured by an antenna for V2X (vehicle-to-vehicle or road-to-vehicle communication), for a communication terminal, or the like.

The first embodiment describes a form in which the first antenna element 13a including a patch antenna having a reception frequency of 2.4 GHz is mounted on the first antenna substrate 13b. However, the first antenna element 13a may be attached to either an inner wall or an outer wall of the first inner case 12, or an inner wall of the first antenna case 11.

The first antenna element 13a is held on the first flat surface portion 162 of the first resin base 16 with the first antenna substrate 13b and other components interposed therebetween.

An electronic device related to the first antenna element 13a, and the first antenna element 13a or the like, are mounted on the first antenna substrate 13b. The first antenna substrate 13b is attached to the first resin base 16.

The first antenna cable 19a is connected to the first antenna substrate 13b.

The first antenna cable 19a is used for supplying electric power to the electronic device provided on the first antenna substrate 13b and outputting signals obtained by the first antenna element 13a.

The first ground plate 13c is provided to improve the sensitivity of the first antenna element 13a.

The first shield cover 13d covers a lower surface and a side surface of the electronic device provided on the first antenna substrate 13b.

As a result, it is possible to reduce the influence of noise emitted from the electronic device on the first antenna element 13a.

The first pad 14 is an elastic member made of elastomer, rubber, or the like.

As shown in FIG. 3, the first pad 14 has a portion provided between a lower end peripheral edge portion of the first antenna case 11 and a peripheral edge portion of the first resin base 16, and a portion provided between a lower end peripheral edge portion of the first inner case 12 and an upper surface of the first resin base 16. The portion of the first pad 14 provided between the lower end peripheral edge portion of the first antenna case 11 and the peripheral edge portion of the first resin base 16 and the portion of the first pad 14 provided between the lower end peripheral edge portion of the first inner case 12 and the upper surface of the first resin base 16 are integrally formed.

The lower end peripheral edge portion of the first antenna case 11 is fitted into a peripheral edge portion of the first pad 14.

The peripheral edge portion of the first pad 14 closes a gap between the lower end peripheral edge portion of the first antenna case 11 and the peripheral edge portion of the first resin base 16.

A first through hole 141 penetrating the first pad 14 in direction z is provided at the rear of the first pad 14 in direction x.

For example, the first through hole 141 is provided in a region located below the first camera opening 11a in direction z.

The first through hole 141 is used for discharging water that enters from the first camera opening 11a to the lower side of the first pad 14.

The lower end peripheral edge portion of the first inner case 12 is fitted into an upper surface of the first pad 14 inside the peripheral edge portion of the first pad 14.

This inhibits entry of water into the first inner case 12 (stops water).

The portion of the first pad 14 provided between the first antenna case 11 and the first resin base 16 and the portion of the first pad 14 provided between the first inner case 12 and the first resin base 16 may be configured of separate bodies.

The first resin base 16 has a first wall portion 161 and the first flat surface portion 162.

The first resin base 16 is covered with the first antenna case 11 from above. The first resin base 16 is an antenna base that forms a housing space that houses the first antenna element 13a, the first camera 18a, and other components.

The first wall portion 161 has a substantially truncated square pyramid outer shape with an open lower surface. The substantially truncated square pyramid outer shape forming the first wall portion 161 has a front surface portion, a rear surface portion, a left side surface portion, a right side surface portion, and an upper surface portion.

With the first antenna device 1 for the vehicle attached to the vehicle, an imaging area of an image sensor of the first camera 18a faces a predetermined direction at the rear of the vehicle. In order to achieve the above, a surface of the rear surface portion of the first wall portion 161 to which the first camera 18a is attached forms a predetermined angle θ with the first flat surface portion 162 when viewed in direction y.

A first camera mounting opening 161a is provided on the rear surface portion of the first wall portion 161.

The first seal member 20a such as an O-ring is provided around the first camera mounting opening 161a.

The first camera 18a is fixed to the rear surface portion of the first wall portion 161 with screws.

The first camera 18a is connected to the later-described first connector 18b through the first camera mounting opening 161a.

The first seal member 20a is sandwiched between the rear surface portion of the first wall portion 161 and the first camera 18a, and the rear surface portion of the first wall portion 161 and the first camera 18a are fixed with screws. As a result, a watertight structure is formed between the first wall portion 161 and the first camera 18a, and it is possible to prevent water from entering the inside of the first wall portion 161 through the first camera mounting opening 161a.

The first connector 18b connected to the first camera 18a is arranged inside the first wall portion 161.

The first flat surface portion 162 has a substantially flat shape. The first flat surface portion 162 has an outer shape that is substantially the same as the outer shape of the lower end peripheral edge portion of the first antenna case 11.

A peripheral edge portion of the first flat surface portion 162 is attached to the first antenna case 11 with the first pad 14 interposed therebetween.

A central portion of the first flat surface portion 162 is open.

The first wall portion 161 extending upward in direction z is formed around the open region in the central portion of the first flat surface portion 162.

The first wall portion 161 and the first flat surface portion 162 are integrally formed.

The first antenna unit 13 is attached to an upper surface of the first flat surface portion 162 at a region in front of the first wall portion 161 in direction x.

Additionally, the first inner case 12 is attached with screws to the upper surface of the first flat surface portion 162 at the region in front of the first wall portion 161 in direction x. At this time, the first inner case 12 covers the first antenna element 13a, the first antenna substrate 13b, the first ground plate 13c, and the first shield cover 13d.

The first pad 14 is sandwiched between the first resin base 16 and the first inner case 12.

The first pad 14 is sandwiched between the first resin base 16 and the first inner case 12, and the first resin base 16 and the first inner case 12 are fixed with screws. As a result, a watertight structure is formed between the first inner case 12 and the first resin base 16, and the first antenna element 13a and other components housed in the internal space can be waterproofed.

A cable hole 163 is provided below the front surface portion of the first wall portion 161 and lower than a region where the first flat surface portion 162 and the first wall portion 161 contact each other. The first antenna cable 19a passes through the cable hole 163.

The ring-shaped first waterproof seal 20b is provided on a lower surface of the first flat surface portion 162. The first waterproof seal 20b is used as a water seal packing around a roof opening 101.

A first mounting member 17a of the first metal base 17, the first antenna cable 19a, and the first camera cable 19b pass through the inside of the ring constituting the first waterproof seal 20b.

The first waterproof seal 20b is sandwiched between the first flat surface portion 162 and the roof 100 of the vehicle. As a result, a watertight structure is formed between the first flat surface portion 162 and the roof 100 of the vehicle, and water can be prevented from entering the roof opening 101.

The first metal base 17 is an antenna base made of metal such as aluminum. The first metal base 17 is provided at a central portion of the first flat surface portion 162, that is, at a position facing a lower opening 161b of the first wall portion 161 in direction z.

The first metal base 17 is attached to the first resin base 16 with screws.

The first mounting member 17a is attached to a lower surface of the first metal base 17. The first mounting member 17a is a capture fastener, a washer with claws, a nut, or the like.

A first metal base opening 17b is provided in the first metal base 17.

The first antenna cable 19a and the first camera cable 19b extend below the roof 100 of the vehicle through the lower opening 161b, the first metal base opening 17b, and the roof opening 101 provided in the roof 100 of the vehicle.

The first camera 18a is arranged such that the imaging area of the image sensor of the first camera 18a faces the rear of the vehicle.

The first camera 18a includes an image sensor such as a CMOS and a lens.

The lens of the first camera 18a guides external light to the imaging area of the image sensor of the first camera 18a.

The light from said rear is incident on the lens of the first camera 18a through the first camera opening 11a.

The light incident on the lens of the first camera 18a is recorded by the image sensor of the first camera 18a as an image signal.

The image signal obtained by the first camera 18a may correspond to a moving image or a still image.

A housing that holds a circuit board and the image sensor of the first camera 18a has a waterproof structure. The housing that holds the circuit board and the image sensor of the first camera 18a is made of metal (e.g., aluminum) that also serves as a shielded conductor.

The first connector 18b is electrically connected to the first camera 18a in a detachable manner.

The first camera 18a and the first connector 18b sandwich the first camera mounting opening 161a of the first wall portion 161.

The first camera cable 19b is used for supplying electric power and control signals to the first camera 18a and outputting image signals obtained by the first camera 18a.

The first camera cable 19b is electrically connected to the first camera 18a through the first connector 18b.

The roof opening 101 is provided in the roof 100 of the vehicle. The first mounting member 17a provided on the first metal base 17, the first antenna cable 19a, and the first camera cable 19b pass through the roof opening 101.

The first antenna device 1 for the vehicle including the first metal base 17 is fixed to an upper surface of the roof 100 by using the first mounting member 17a.

Next, a procedure of attaching the first antenna unit 13 to the first resin base 16 and attaching the first camera 18a to the first resin base 16 will be described.

The first antenna cable 19a is attached to the first antenna unit 13 in advance.

The first camera cable 19b is attached to the first connector 18b in advance.

The first camera 18a is separated from the first connector 18b.

The first antenna cable 19a is passed through the cable hole 163 from the side of the first resin base 16 to which the first antenna unit 13 is attached.

After that, the first antenna unit 13 is fixed to the first flat surface portion 162 of the first resin base 16 with screws.

The first connector 18b is housed inside the first wall portion 161, that is, in a space surrounded by the front surface portion, the rear surface portion, the left side surface portion, the right side surface portion, and the upper surface portion that form the first wall portion 161.

The first camera 18a is fixed to the rear surface portion of the first wall portion 161 with screws while sandwiching the first seal member 20a.

When the first camera 18a is fixed to the first wall portion 161, the first camera 18a and the first connector 18b are connected.

As a result, the first camera 18a and the first connector 18b are attached to the first resin base 16 with the first camera 18a and the first connector 18b sandwiching the rear surface portion of the first wall portion 161.

From above, the first antenna cable 19a and the first camera cable 19b are passed through the first metal base opening 17b.

After that, the first metal base 17 is fixed to the first resin base 16 with screws.

Note that the attachment of the first antenna unit 13 to the first resin base 16 may be performed before or after the attachment of the first camera 18a to the first resin base 16.

When fixing the first camera 18a to a member different from the antenna base such as the first inner case 12, it is necessary to perform a work of wiring the first camera cable 19b between the first inner case 12 and the antenna base.

In the first embodiment, the first camera 18a is fixed to the first resin base 16.

At this time, there is no need to wire the first camera cable 19b between a member different from the first resin base 16 and the first resin base 16.

For this reason, as compared with a form in which the first camera 18a is fixed to a member provided above the antenna base, wiring work of the first camera cable 19b can be simplified, for example, and assembly of the first antenna device 1 for the vehicle can be facilitated.

Additionally, the first camera 18a is attached to a region (rear surface portion of first wall portion 161) of the first resin base 16 which is raised in direction z.

The first connector 18b is arranged inside the first wall portion 161. The first camera 18a is arranged outside the first wall portion 161. The first connector 18b and the first camera 18a are connected so that the first connector 18b and the first camera 18a sandwich the rear surface portion of the first wall portion 161, and the first camera 18a is attached to the rear surface portion of the first wall portion 161 with screws. This completes the fixing of the first camera 18a to the first resin base 16.

A direction in which the first camera 18a and the first connector 18b sandwich the first wall portion 161 is parallel to a direction in which the first camera 18a applies a force on the first wall portion 161 with screws.

For this reason, wiring and camera attachment can be performed in a series of operations. As compared with a form in which the first camera 18a is attached to a flat shape portion of the first resin base 16, the number of man-hours is small, and assembly of the first antenna device 1 for the vehicle can be facilitated.

Additionally, as compared with a form in which the first connector 18b and the first camera 18a are connected and then the first camera cable 19b is pulled to the lower opening 161b side to fix the first camera 18a, the step of pulling the first camera cable 19b to the lower opening 161b side can be omitted. For this reason, the number of man-hours is small, and assembly of the first antenna device 1 for the vehicle can be facilitated.

Additionally, the first camera 18a can be attached at a high position. For this reason, as compared with a form in which the first camera 18a is attached to a flat shape portion of the first resin base 16, it is possible to wire the first camera cable 19b below the first resin base 16 without largely bending the first camera cable 19b. Since the first camera cable 19b does not need to be bent largely, it is possible to curb damage such as disconnection of the first camera cable 19b.

Additionally, the region where the first camera 18a is attached to the first resin base 16 has a watertight structure with the first seal member 20a interposed therebetween.

For this reason, it is possible to prevent water from entering the inside of the first wall portion 161 through the opening (first camera mounting opening 161a) in the region where the first camera 18a is attached to the first resin base 16.

(Modification of First Embodiment)

In the first embodiment, the form has been described in which the first metal base 17 is provided in the lower opening 161b of the first wall portion 161.

Note, however, that the first metal base 17 does not necessarily have to be provided in the lower opening 161b of the first wall portion 161.

Figure 4:
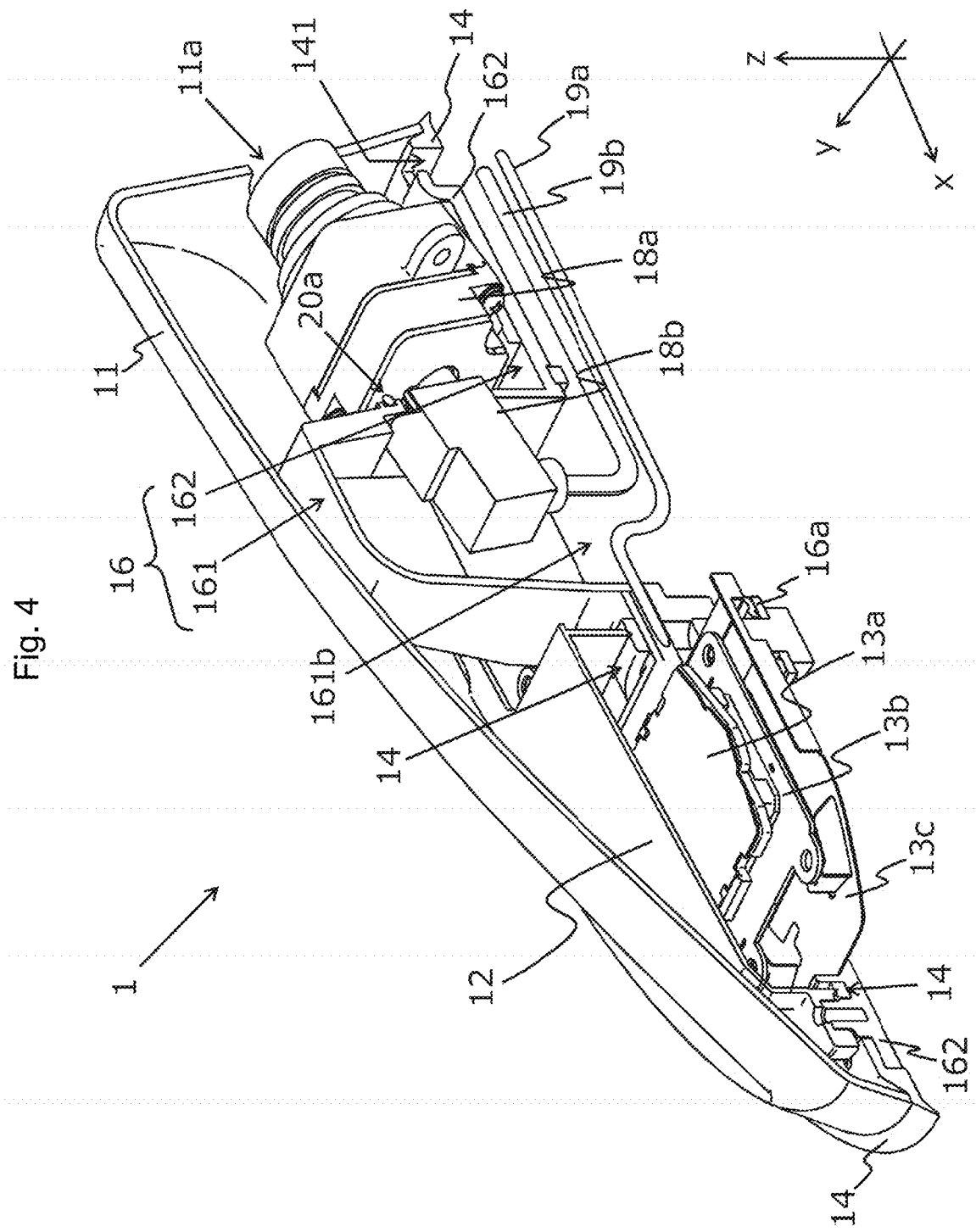
FIG. 4 is a cross-sectional perspective view of an antenna device for the vehicle according to a modification of the first embodiment.
Figure 5:
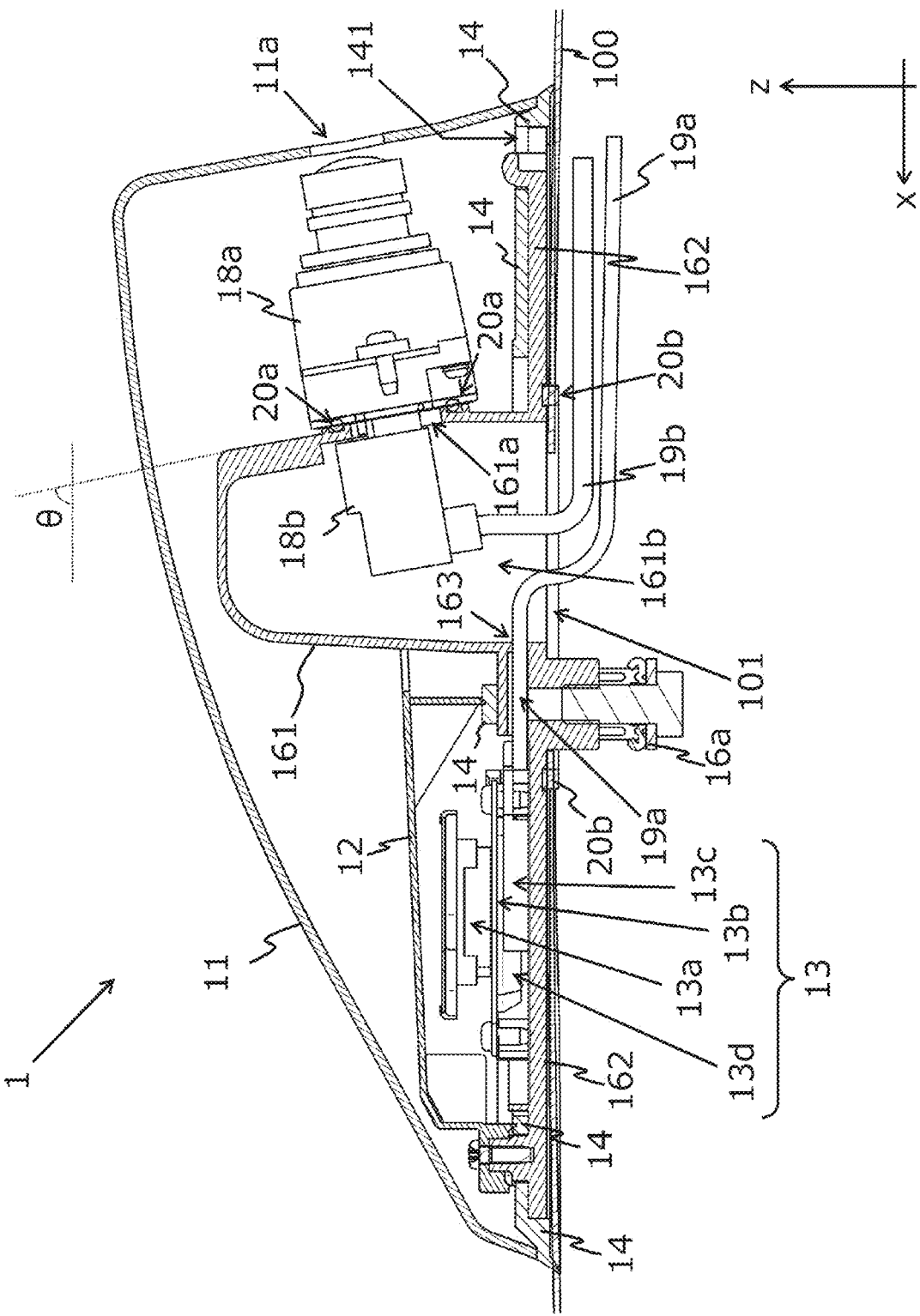
FIG. 5 is a cross-sectional configuration diagram of the antenna device for the vehicle according to the modification of the first embodiment.

In this case, as shown in FIGS. 4 and 5, a mounting member 16a of a first antenna device 1 for a vehicle according to a modification of the first embodiment is attached to a lower surface of a first resin base 16.

A first antenna cable 19a and a first camera cable 19b extend below a roof 100 of the vehicle through a lower opening 161b, and a roof opening 101 provided in the roof 100 of the vehicle.

Other configurations are similar to those of the first embodiment.

In the modification of the first embodiment, as compared with the first embodiment, since the first metal base 17 is not provided, the number of parts can be reduced, the structure can be simplified, and the cost can be reduced.

Second Embodiment

In the first embodiment, the form has been described in which the first wall portion 161 that houses the first connector 18b has a substantially truncated square pyramid shape with an open lower surface, and the first inner case 12 that houses the first antenna unit 13 is provided in front of the first wall portion 161 in direction x.

In a second embodiment, a second inner case 22 is provided on an upper portion of a second wall portion 261, and the second inner case 22 and the second wall portion 261 house a second connector 28b and a second antenna unit 23.

Hereinafter, differences from the first embodiment will be mainly described.

A second antenna device 2 for a vehicle according to the second embodiment is attached to an upper surface of a vehicle such as a roof 100.

Figure 6:
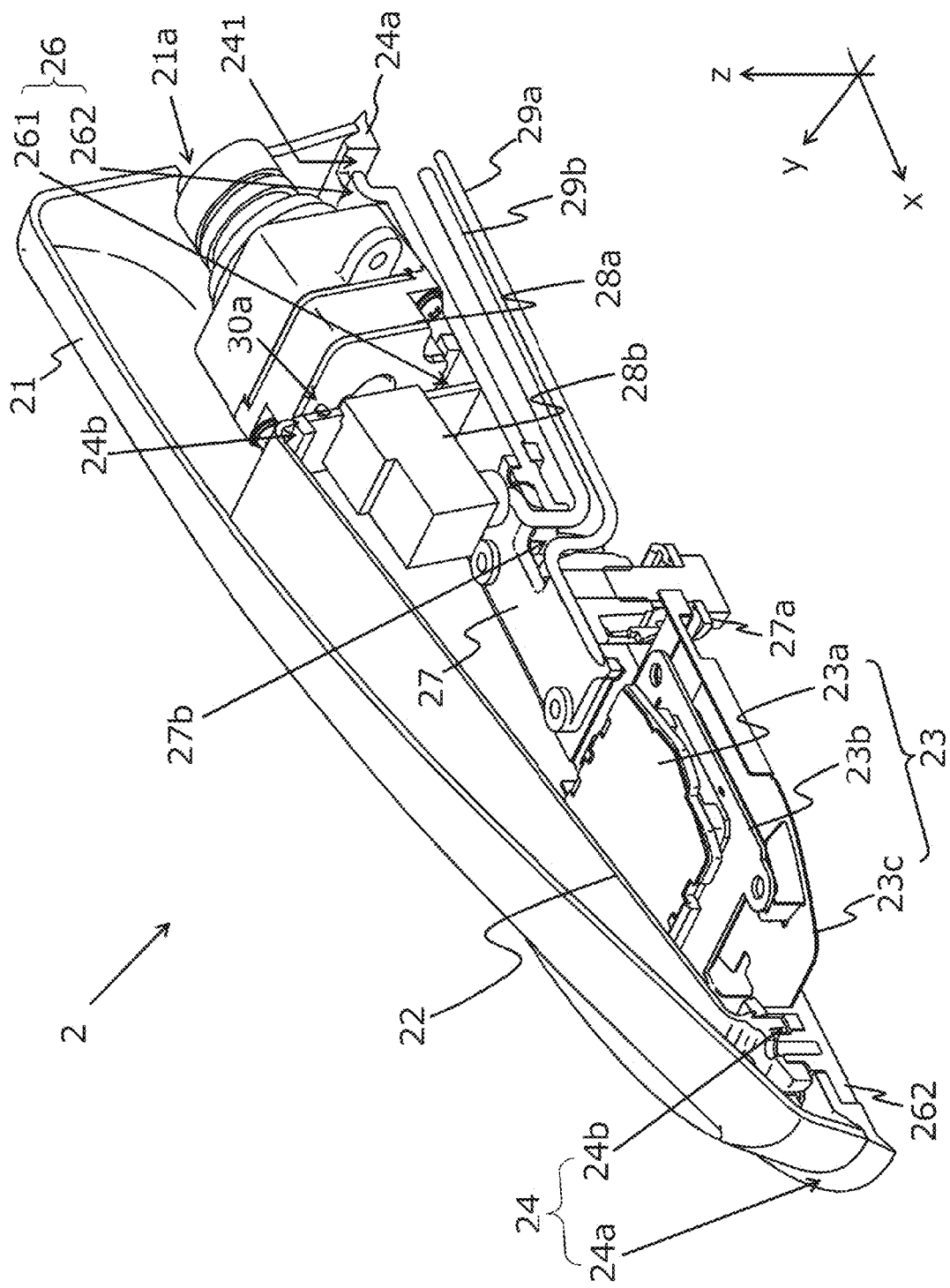
FIG. 6 is a cross-sectional perspective view of an antenna device for the vehicle according to a second embodiment.
Figure 7:
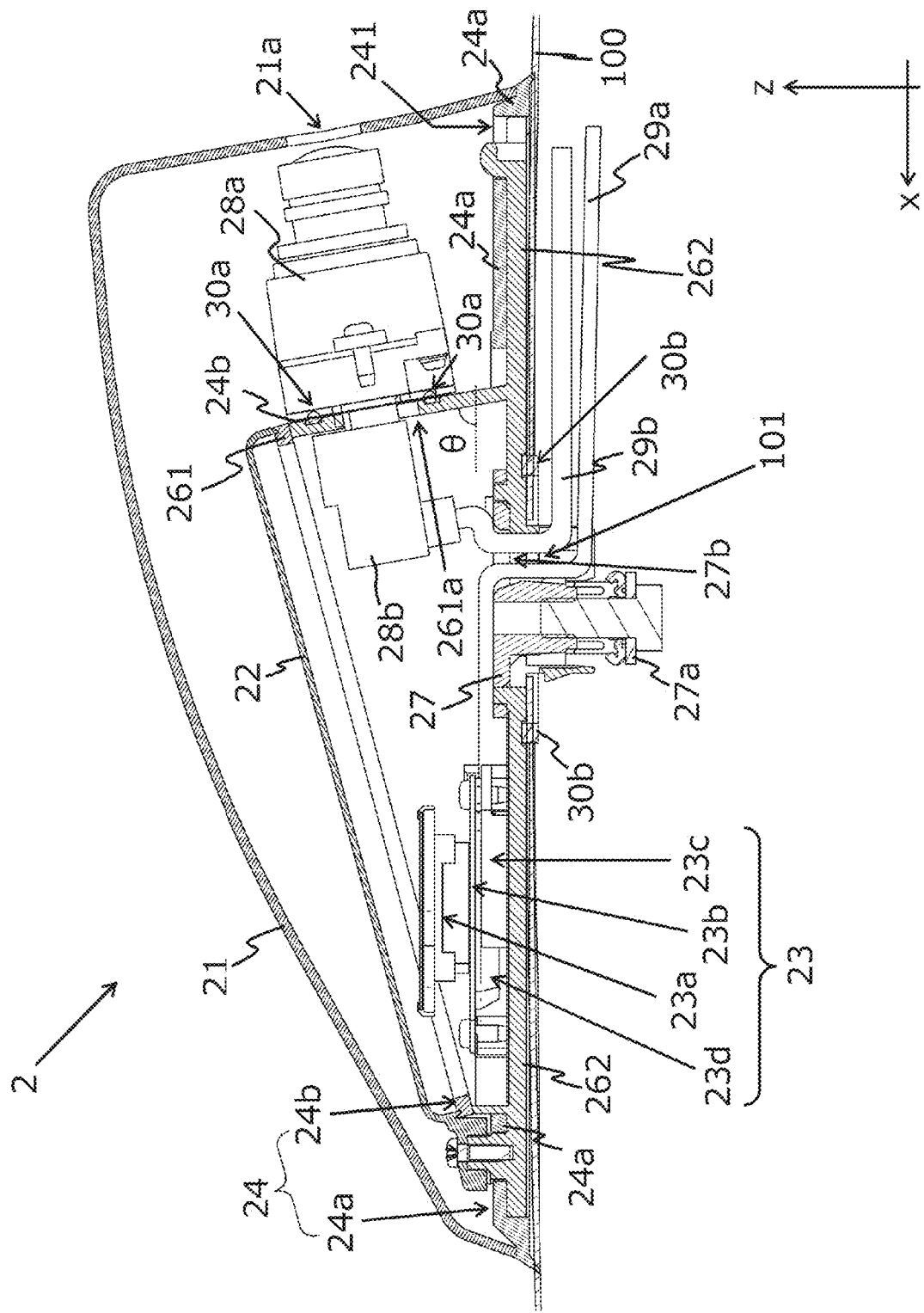
FIG. 7 is a cross-sectional configuration diagram of an antenna device for a vehicle according to the second embodiment.
Figure 8:
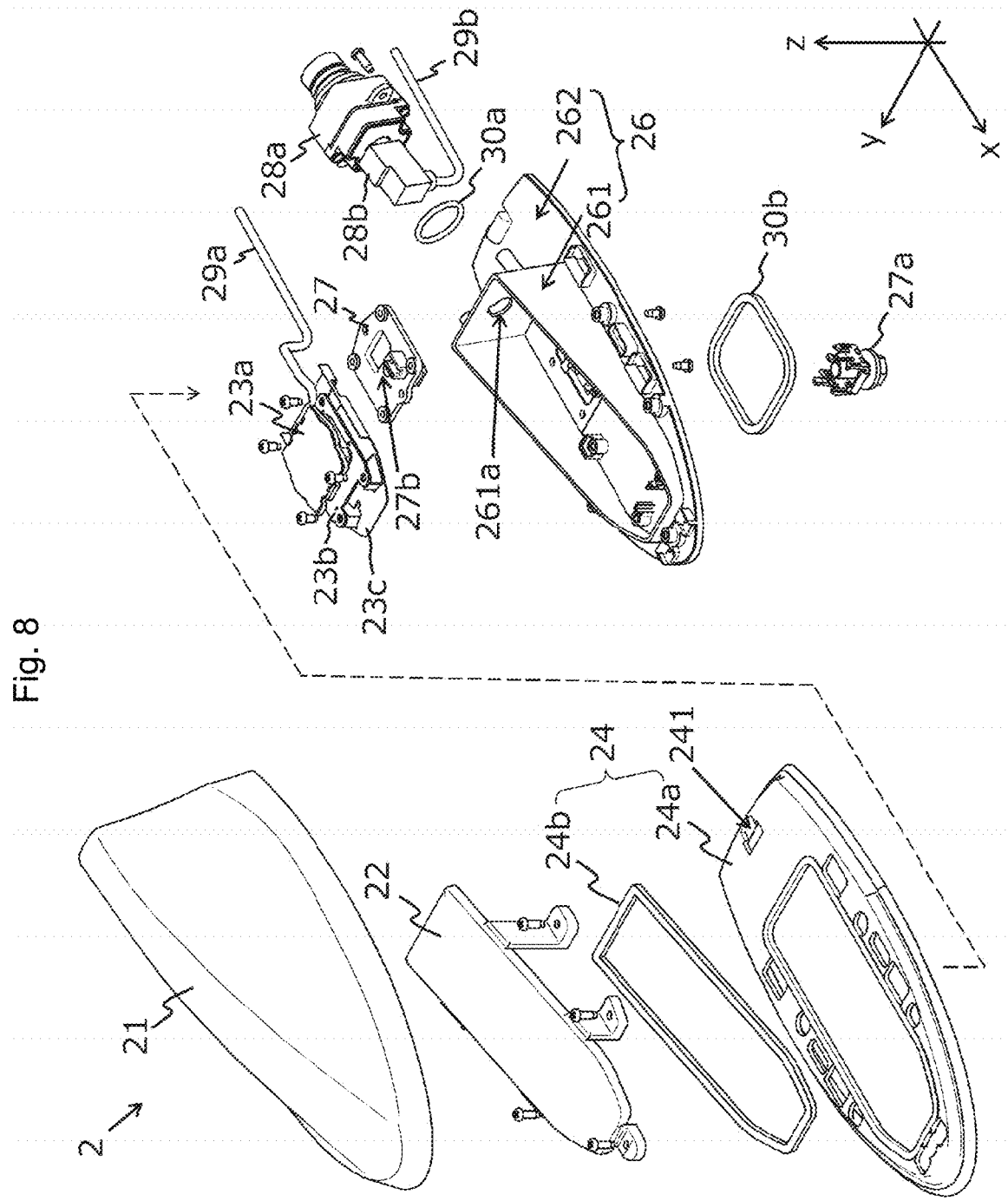
FIG. 8 is an exploded perspective view of the antenna device for the vehicle according to the second embodiment.

For example, as shown in FIGS. 6 to 8, the second antenna device 2 for the vehicle includes a second antenna case 21, the second inner case 22, the second antenna unit 23, a second pad 24, a second resin base 26, a second metal base 27, a second camera 28a, the second connector 28b, a second antenna cable 29a, a second camera cable 29b, a second seal member 30a, and a second waterproof seal 30b.

Note that the second antenna device 2 for the vehicle is an example of the antenna device for the vehicle. The second antenna case 21 is an example of the antenna case. The second inner case 22 is an example of the inner case. The second antenna unit 23 is an example of the antenna unit. The second pad 24 is an example of the pad. The second resin base 26 is an example of the resin base. The second metal base 27 is an example of the metal base. The second camera 28a is an example of the camera. The second connector 28b is an example of the connector. The second antenna cable 29a is an example of the antenna cable. The second camera cable 29b is an example of the camera cable. The second seal member 30a is an example of the seal member. The second waterproof seal 30b is an example of the waterproof seal.

The configuration of the second antenna case 21 including a second camera opening 21a is similar to the configuration of the first antenna case 11 including the first camera opening 11a of the first embodiment.

The second inner case 22 is made of synthetic resin having radio wave transparency. The second inner case 22 has an open lower surface and covers the later-described second wall portion 261 from above.

For example, the second antenna unit 23 and the second connector 28b are arranged in an internal space formed by the second inner case 22 and the second resin base 26 (second wall portion 261, second flat surface portion 262).

The second antenna unit 23 has a second antenna element 23a, a second antenna substrate 23b, a second ground plate 23c, and a second shield cover 23d. The configuration of the second antenna unit 23 is similar to the configuration of the first antenna unit 13 (first antenna element 13a, first antenna substrate 13b, first ground plate 13c, first shield cover 13d) of the first embodiment.

The configuration of the second antenna cable 29a is similar to the configuration of the first antenna cable 19a of the first embodiment.

The second pad 24 has an outer pad 24a and an inner pad 24b.

The outer pad 24a is an annular elastic member made of elastomer, rubber, or the like. The outer pad 24a is provided at least between a lower end peripheral edge portion of the second antenna case 21 and a peripheral edge portion of the second resin base 26, and between a lower end peripheral edge portion of the second inner case 22 and the second flat surface portion 262 of the second resin base 26.

The lower end peripheral edge portion of the second antenna case 21 is fitted into a peripheral edge portion of the outer pad 24a. The peripheral edge portion of the outer pad 24a closes a gap between the lower end peripheral edge portion of the second antenna case 21 and the peripheral edge portion of the second resin base 26.

The lower end peripheral edge portion of the second inner case 22 is fitted into an upper surface of the outer pad 24a inside the peripheral edge portion of the outer pad 24a. This inhibits entry of water into the second inner case 22 (stops water).

A second through hole 241 penetrating the outer pad 24a in direction z is provided at the rear of the outer pad 24a in direction x.

For example, the second through hole 241 is provided in a region located below the second camera opening 21a in direction z.

The second through hole 241 is used for discharging water that enters from the second camera opening 21a to the lower side of the outer pad 24a.

The inner pad 24b is an annular elastic member made of elastomer, rubber, or the like.

The inner pad 24b is provided between the lower end peripheral edge portion of the second inner case 22 and the upper portion of the second wall portion 261 of the second resin base 26.

The lower end peripheral edge portion of the second inner case 22 is fitted into the inner pad 24b to inhibit entry of water into the second inner case 22 (stop water).

The second resin base 26 has the second wall portion 261 and the second flat surface portion 262.

The second resin base 26 is covered with the second antenna case 21 from above. The second resin base 26 is an antenna base that forms a housing space that houses the second antenna element 23a, the second camera 28a, and other components.

The second wall portion 261 has a substantially wedge-like outer shape with open upper and lower surfaces. The substantially wedge-like outer shape forming the second wall portion 261 has a front surface portion, a rear surface portion, a left side surface portion, and a right side surface portion.

With the second antenna device 2 for the vehicle attached to the vehicle, an imaging area of an image sensor of the second camera 28a faces a predetermined direction at the rear of the vehicle. In order to achieve the above, a surface of the rear surface portion of the second wall portion 261 to which the second camera 28a is attached forms a predetermined angle $\theta$ with the second flat surface portion 262 when viewed in direction y.

The rear surface portion of the second wall portion 261 is higher in direction z than a front surface portion of the second wall portion 261.

The upper side of the left side surface portion and the upper side of the right side surface portion of the second wall portion 261 are inclined, so that their height at the rear in direction x is higher than their height at the front in direction x.

The height of the upper portion of the second wall portion 261 decreases in a slope shape in a direction from the rear in direction x to the front in direction x, that is, a direction from the second camera 28a to the second wall portion 261.

A second camera mounting opening 261a is provided on the rear surface portion of the second wall portion 261.

The second seal member 30a such as an O-ring is provided around the second camera mounting opening 261a.

The second camera 28a is fixed to the rear surface portion of the second wall portion 261 with screws.

The second camera 28a is connected to the later-described second connector 28b through the second camera mounting opening 261a.

The second seal member 30a is sandwiched between the rear surface portion of the second wall portion 261 and the second camera 28a, and the rear surface portion of the second wall portion 261 and the second camera 28a are fixed with screws. As a result, a watertight structure is formed between the second wall portion 261 and the second camera 28a, and it is possible to prevent water from entering the inside of the second wall portion 261 through the second camera mounting opening 261a.

The second antenna unit 23, the second metal base 27, and the second connector 28b connected to the second camera 28a are arranged inside the second wall portion 261. The inner side of the second wall portion 261 is a region surrounded by the front surface portion, the rear surface portion, the left side surface portion, and the right side surface portion forming the second wall portion 261.

The second flat surface portion 262 has a substantially flat shape. The second flat surface portion 262 has an outer shape substantially the same as the outer shape of the lower end peripheral edge portion of the second antenna case 21.

A peripheral edge portion of the second flat surface portion 262 is attached to the second antenna case 21 with the outer pad 24a interposed therebetween.

A central portion of the second flat surface portion 262 is open.

The second metal base 27 is provided in the central portion of the second flat surface portion 262.

The second wall portion 261 and the second flat surface portion 262 are integrally formed.

The second antenna unit 23 is attached to an upper surface of the second flat surface portion 262 at a region in front of the second camera 28a in direction x.

The second wall portion 261 is formed on the second flat surface portion 262 so as to surround a region of the second flat surface portion 262 in which the second metal base 27 is provided and a region of the second flat surface portion 262 to which the second antenna unit 23 is attached.

That is, the second wall portion 261 extends upward from the second flat surface portion 262.

Additionally, the second inner case 22 is attached to the upper end of the second wall portion 261 with the inner pad 24b interposed therebetween.

The inner pad 24b is sandwiched between the second resin base 26 and the second inner case 22. As a result, a watertight structure is formed between the second resin base 26 and the second inner case 22, and the second antenna element 23a and other components housed in the internal space can be waterproofed.

In a form in which the force applied to the inner pad 24b is not uniform, such as when the upper portion of the second wall portion 261 has a stepped shape, water easily enters a portion where the force applied to the inner pad 24b is weak.

In the second embodiment, the upper portion of the second wall portion 261 has a slope shape. For this reason, the force applied to the inner pad 24b in a direction perpendicular to the surface formed by the inner pad 24b is substantially the same everywhere on the inner pad 24b.

Hence, the waterproofing property can be enhanced as compared with the form in which the upper portion of the second wall portion 261 does not have a slope shape.

The ring-shaped second waterproof seal 30b is provided on a lower surface of the second flat surface portion 262. The second waterproof seal 30b is used as a water seal packing around a roof opening 101.

A second mounting member 27a of the second metal base 27, the second antenna cable 29a, and the second camera cable 29b pass through the inside of the ring constituting the second waterproof seal 30b.

The second waterproof seal 30b is sandwiched between the second flat surface portion 262 and the roof 100 of the vehicle. As a result, a watertight structure is formed between the second flat surface portion 262 and the roof 100, and water can be prevented from entering the roof opening 101.

The second metal base 27 is an antenna base made of metal such as aluminum. The second metal base 27 is provided in the central portion of the second flat surface portion 262.

The second mounting member 27a is attached to a lower surface of the second metal base 27. The second mounting member 27a is a capture fastener, a washer with claws, a nut, or the like.

A second metal base opening 27b is provided in the second metal base 27.

The second antenna cable 29a and the second camera cable 29b extend below the roof 100 of the vehicle through the second metal base opening 27b, and the roof opening 101 provided in the roof 100 of the vehicle.

The configurations of the second camera 28a and the second connector 28b are similar to the configurations of the first camera 18a and the first connector 18b of the first embodiment.

The configuration of the second camera cable 29b is similar to the configuration of the first camera cable 19b of the first embodiment.

The roof opening 101 is provided in the roof 100 of the vehicle. The second mounting member 27a provided on the second metal base 27, the second antenna cable 29a, and the second camera cable 29b pass through the roof opening 101.

The second antenna device 2 for the vehicle including the second metal base 27 is fixed to an upper surface of the roof 100 by using the second mounting member 27a.

Next, a procedure of attaching the second antenna unit 23 to the second resin base 26 and attaching the second camera 28a to the second resin base 26 will be described.

The second antenna cable 29a is attached to the second antenna unit 23 in advance.

The second camera cable 29b is attached to the second connector 28b in advance.

The second camera 28a is separated from the second connector 28b.

The second metal base 27 is fixed on the second resin base 26 with screws.

From above, the second antenna cable 29a and the second camera cable 29b are passed through the second metal base opening 27b.

After that, the second antenna unit 23 is fixed to the second flat surface portion 262 of the second resin base 26 with screws.

The second camera 28a is fixed to the rear surface portion of the second wall portion 261 with screws while sandwiching the second seal member 30a.

When the second camera 28a is fixed to the second wall portion 261, the second camera 28a and the second connector 28b are connected.

As a result, the second camera 28a and the second connector 28b are attached to the second resin base 26 with the second camera 28a and the second connector 28b sandwiching the rear surface portion of the second wall portion 261.

Note that the attachment of the second antenna unit 23 to the second resin base 26 may be performed before or after the attachment of the second camera 28a to the second resin base 26.

When fixing the second camera 28a to a member different from the antenna base such as the second inner case 22, it is necessary to perform a work of wiring the second camera cable 29b between the second inner case 22 and the antenna base.

In the second embodiment, the second camera 28a is fixed to the second resin base 26.

At this time, there is no need to wire the second camera cable 29b between a member different from the second resin base 26 and the second resin base 26.

For this reason, as compared with a form in which the second camera 28a is fixed to a member different from the antenna base, wiring work of the second camera cable 29b can be simplified, for example, and assembly of the second antenna device 2 for the vehicle can be facilitated.

Additionally, the second camera 28a is attached to a region (rear surface portion of second wall portion 261) of the second resin base 26 which is raised in direction z.

The second connector 28b is arranged inside the second wall portion 261. The second camera 28a is arranged outside the second wall portion 261. The second connector 28b and the second camera 28a are connected so that the second connector 28b and the second camera 28a sandwich the rear surface portion of the second wall portion 261, and the second camera 28a is attached to the rear surface portion of the second wall portion 261 with screws. This completes the fixing of the second camera 28a to the second resin base 26.

A direction in which the second wall portion 261 is sandwiched between the second camera 28a and the second connector 28b is parallel to a direction in which the second camera 28a applies a force on the second wall portion 261 with screws.

For this reason, wiring and camera attachment can be performed in a series of operations. As compared with a form in which the second camera 28a is attached to a flat shape portion of the second resin base 26, the number of man-hours is small, and assembly of the second antenna device 2 for the vehicle can be facilitated.

Additionally, as compared with a form in which the second connector 28b and the second camera 28a are connected and then the second camera cable 29b is pulled to the second metal base opening 27b side to fix the second camera 28a, the step of pulling the second camera cable 29b to the second metal base opening 27b side can be omitted. For this reason, the number of man-hours is small, and assembly of the second antenna device 2 for the vehicle can be facilitated.

Additionally, the second camera 28a can be attached at a high position. For this reason, as compared with a form in which the second camera 28a is attached to a flat shape portion of the second resin base 26, it is possible to wire the second camera cable 29b below the second resin base 26 without largely bending the second camera cable 29b. Since the second camera cable 29b does not need to be bent largely, it is possible to curb damage such as disconnection of the second camera cable 29b.

Additionally, the region where the second camera 28a is attached to the second resin base 26 has a watertight structure with the second seal member 30a interposed therebetween.

For this reason, it is possible to prevent water from entering the region surrounded by the second resin base 26 and the second inner case 22 through the opening (second camera mounting opening 261a) in the region where the second camera 28a is attached to the second resin base 26.

In the second embodiment, the second inner case 22 functions as a lid of the upper surface of the portion (second wall portion 261) of the second resin base 26 that is raised upward in direction z.

The second metal base 27 has the second metal base opening 27b, and the second antenna cable 29a and the second camera cable 29b pass through the second metal base opening 27b.

The second mounting member 27a protruding downward in direction z is provided in the second metal base 27.

The second waterproof seal 30b is provided so as to surround the second metal base opening 27b and the second mounting member 27a.

When the second waterproof seal 30b becomes large and the area of the region surrounded by the second waterproof seal 30b becomes large, the possibility of water entering through the second waterproof seal 30b increases.

In a case where a portion of the second wall portion 261 corresponding to the lid on the upper surface is integrally formed with the other portions of the second wall portion 261, the second antenna unit 23 is stored in the region surrounded by the second wall portion 261 from below. For this reason, it is necessary to provide the second resin base 26 with a large opening for passing the second antenna unit 23 from below.

Accordingly, it is necessary to enlarge the second metal base 27 so as to fill the opening provided in the second resin base 26.

Additionally, the second waterproof seal 30b that surrounds the opening of the second resin base 26 also needs to be enlarged, but there is a high possibility that water will enter from the enlarged second waterproof seal 30b.

In the second embodiment, since the second inner case 22 and the second wall portion 261 are separate bodies, there is no need to provide the second resin base 26 with an opening for passing the second antenna unit 23 from below, or to enlarge the second waterproof seal 30b.

For this reason, the waterproofing property can be enhanced as compared with the case where the second inner case 22 and the second wall portion 261 are integrated.

Note that the second metal base 27 may form a part of the second resin base 26 (part of second wall portion 261 or part of second flat surface portion 262).

Specifically, a form is considered that the member corresponding to the second metal base 27 is also made of resin and is integrally formed with the second resin base 26.

Third Embodiment

In the second embodiment, the form has been described in which the second connector 28b and the second antenna unit 23 are housed in the internal space formed by the second inner case 22, the second wall portion 261, and the second flat surface portion 262, and the second camera 28a is arranged outside the internal space.

In a third embodiment, a third inner case 32 houses a third antenna unit 33, a third camera 38a, and a third connector 38b.

Hereinafter, differences from the second embodiment will be mainly described.

A third antenna device 3 for a vehicle according to the third embodiment is attached to an upper surface of a vehicle such as a roof 100.

Figure 9:
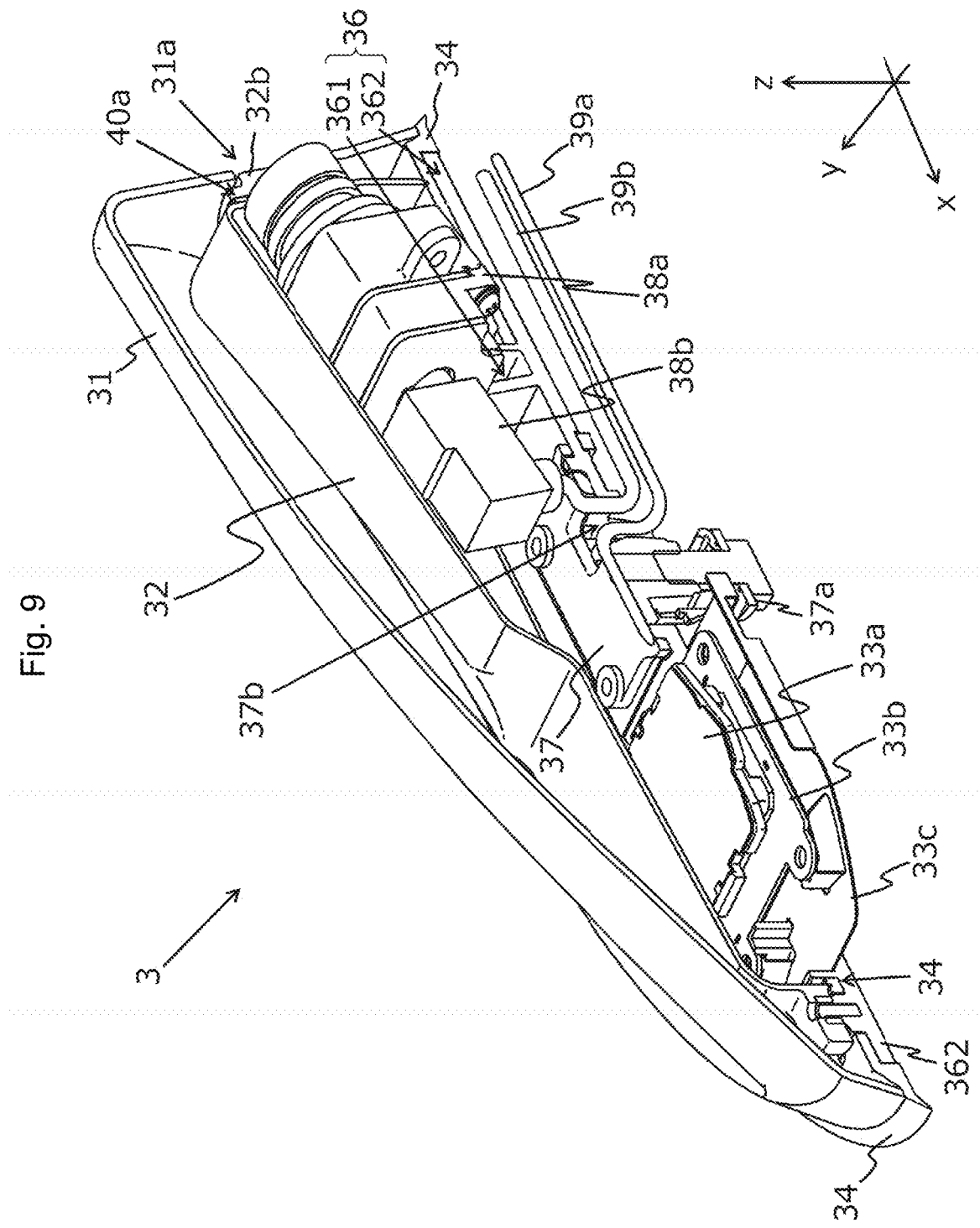
FIG. 9 is a cross-sectional perspective view of an antenna device for a vehicle according to a third embodiment.
Figure 10:
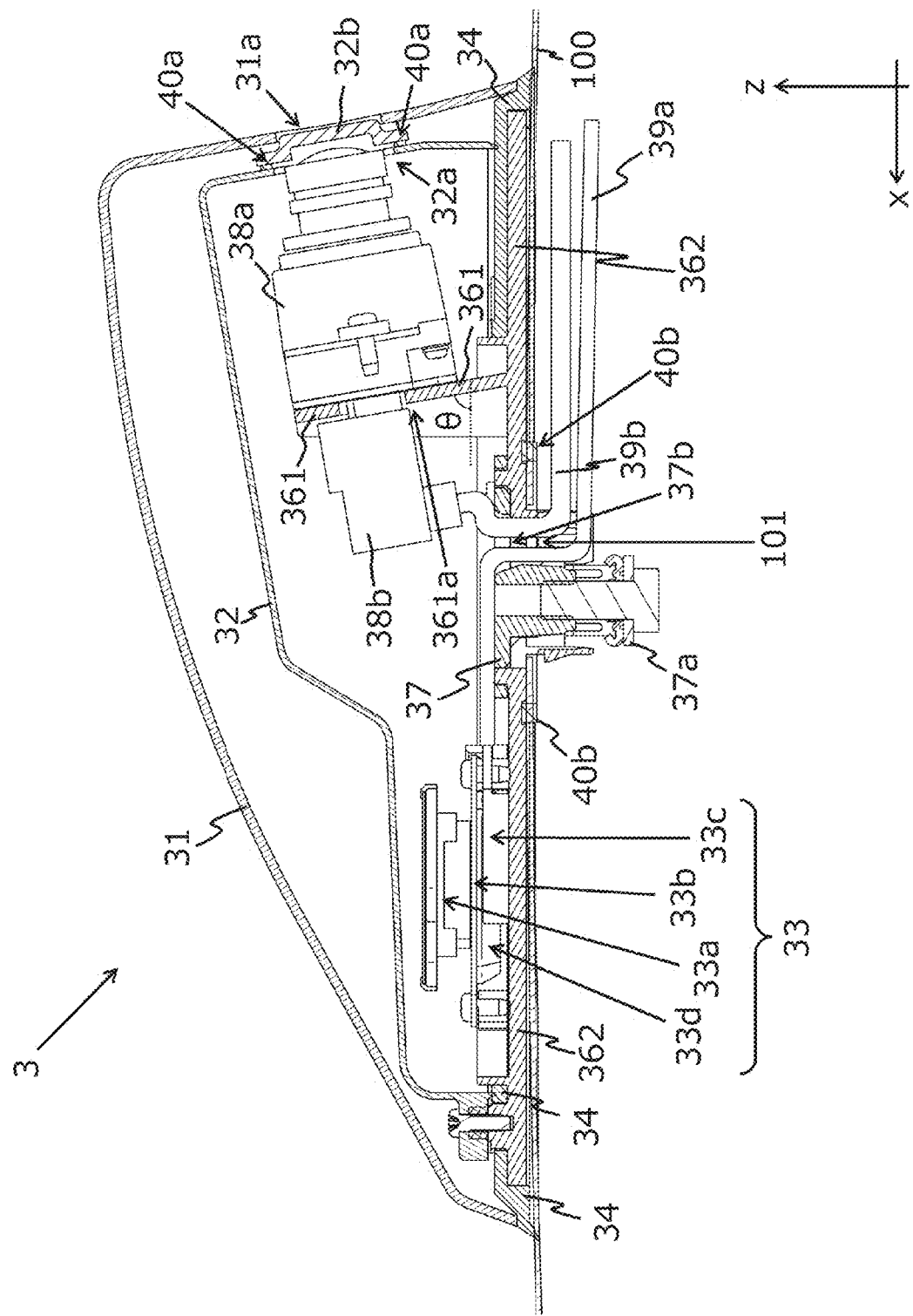
FIG. 10 is a cross-sectional configuration diagram of the antenna device for the vehicle according to the third embodiment.
Figure 11:
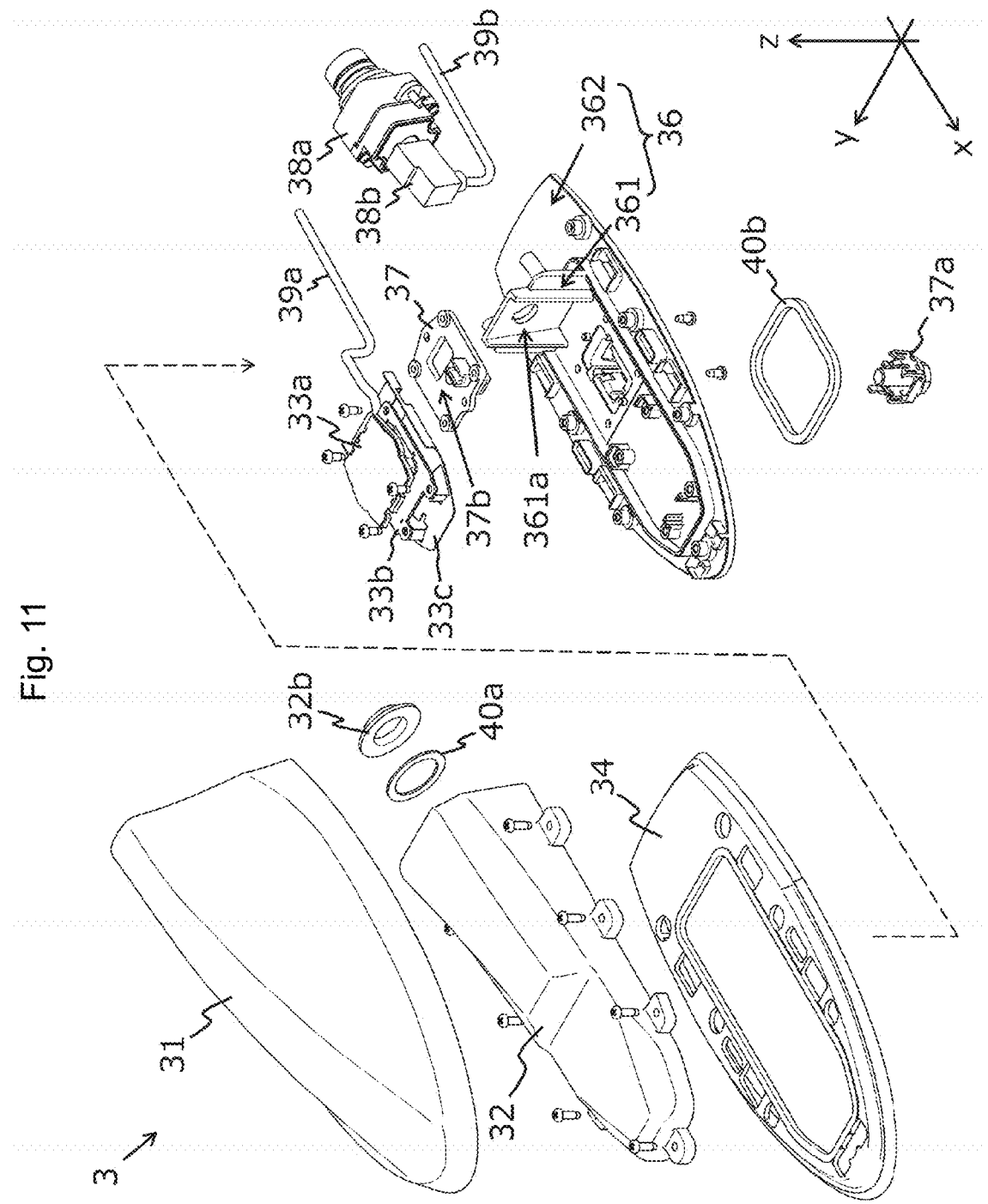
FIG. 11 is an exploded perspective view of the antenna device for the vehicle according to the third embodiment.

For example, as shown in FIGS. 9 to 11, the third antenna device 3 for the vehicle includes a third antenna case 31, the third inner case 32, the third antenna unit 33, a third pad 34, a third resin base 36, a third metal base 37, the third camera 38a, the third connector 38b, a third antenna cable 39a, a third camera cable 39b, a third seal member 40a, and a third waterproof seal 40b.

Note that the third antenna device 3 for the vehicle is an example of the antenna device for the vehicle. The third antenna case 31 is an example of the antenna case. The third inner case 32 is an example of the inner case. The third antenna unit 33 is an example of the antenna unit. The third pad 34 is an example of the pad. The third resin base 36 is an example of the resin base. The third metal base 37 is an example of the metal base. The third camera 38a is an example of the camera. The third connector 38b is an example of the connector. The third antenna cable 39a is an example of the antenna cable. The third camera cable 39b is an example of the camera cable. The third seal member 40a is an example of the seal member. The third waterproof seal 40b is an example of the waterproof seal.

The configuration of the third antenna case 31 including a third camera opening 31a is similar to the configuration of the second antenna case 21 including the second camera opening 21a of the second embodiment.

The third inner case 32 is made of synthetic resin having radio wave transparency. The third inner case 32 has an open lower surface and covers a later-described third antenna element 33a and other components.

For example, the third antenna unit 33, the third camera 38a, and the third connector 38b are arranged in an internal space formed by the third inner case 32 and the third resin base 36 (third flat surface portion 362).

Additionally, a fourth camera opening 32a is provided at the rear of the third inner case 32 in direction x and in a region facing a lens of the third camera 38a and facing the vicinity thereof.

The third seal member 40a such as an O-ring is provided around the fourth camera opening 32a.

A lens cover 32b is attached to the rear of the third inner case 32 in direction x. The lens cover 32b is made of translucent synthetic resin or glass.

The lens cover 32b may be attached to the third inner case 32 with screws, but more preferably, it is attached by adhesion.

The lens cover 32b protects the lens of the third camera 38a.

The third seal member 40a is sandwiched between the third inner case 32 and the lens cover 32b, and the third inner case 32 and the lens cover 32b are fixed to each other. As a result, a watertight structure is formed between the third inner case 32 and the lens cover 32b, and it is possible to prevent water from entering the third inner case 32 through the fourth camera opening 32a.

In other words, the lens cover 32b maintains watertightness with the third inner case 32.

The third antenna unit 33 has the third antenna element 33a, a third antenna substrate 33b, a third ground plate 33c, and a third shield cover 33d. The configuration of the third antenna unit 33 is similar to the configuration of the second antenna unit 23 (second antenna element 23a, second antenna substrate 23b, second ground plate 23c, second shield cover 23d) of the second embodiment.

The configuration of the third antenna cable 39a is similar to the configuration of the second antenna cable 29a of the second embodiment.

The third pad 34 is an elastic member made of elastomer, rubber, or the like.

As shown in FIG. 11, the third pad 34 has a portion provided between a lower end peripheral edge portion of the third antenna case 31 and a peripheral edge portion of the third resin base 36, and a portion provided between a lower end peripheral edge portion of the third inner case 32 and an upper surface of the third resin base 36. The portion provided between the lower end peripheral edge portion of the third antenna case 31 and the peripheral edge portion of the third resin base 36 and the portion provided between the lower end peripheral edge portion of the third inner case 32 and the upper surface of the third resin base 36 are integrally formed.

The lower end peripheral edge portion of the third antenna case 31 is fitted into a peripheral edge portion of the third pad 34.

The peripheral edge portion of the third pad 34 closes a gap between the lower end peripheral edge portion of the third antenna case 31 and the peripheral edge portion of the third resin base 36.

The lower end peripheral edge portion of the third inner case 32 is fitted into an upper surface of the third pad 34 inside the peripheral edge portion of the third pad 34.

This inhibits entry of water into the third inner case 32 (stops water).

The portion of the third pad 34 provided between the third antenna case 31 and the third resin base 36 and the portion of the third pad 34 provided between the third inner case 32 and the third resin base 36 may be configured of separate bodies.

The third resin base 36 has the third wall portion 361 and the third flat surface portion 362.

The third resin base 36 is covered with the third antenna case 31 from above. The third resin base 36 is an antenna base that forms a housing space that houses the third antenna element 33a, the third camera 38a, and other components.

The third wall portion 361 is a protruding portion formed so as to extend upward from the third flat surface portion 362. The third wall portion 361 has a surface that is substantially perpendicular to the front-rear direction of the vehicle.

With the third antenna device 3 for the vehicle attached to the vehicle, an imaging area of an image sensor of the third camera 38a faces a predetermined direction at the rear of the vehicle. In order to achieve the above, a surface of the third wall portion 361 to which the third camera 38a is attached (surface that is substantially perpendicular to front-rear direction of vehicle) forms a predetermined angle θ close to 90 degrees with the third flat surface portion 362 when viewed in direction y.

A third camera mounting opening 361a is provided on the third wall portion 361.

The third camera 38a is fixed to the third wall portion 361.

The third camera 38a and the third connector 38b are connected to each other through the third camera mounting opening 361a.

The third antenna unit 33, the third metal base 37, and the third connector 38b connected to the third camera 38a are arranged in front of the third wall portion 361 in direction x.

The third flat surface portion 362 has a substantially flat shape, and has an outer shape substantially the same as the outer shape of the lower end peripheral edge portion of the third antenna case 31.

A peripheral edge portion of the third flat surface portion 362 is attached to the third antenna case 31 with the third pad 34 interposed therebetween.

A central portion of the third flat surface portion 362 is open.

The third metal base 37 is provided in the central portion of the third flat surface portion 362.

The third wall portion 361 and the third flat surface portion 362 are integrally formed.

Additionally, the third inner case 32 is attached to an upper surface of the third flat surface portion 362 with the third pad 34 interposed therebetween. At this time, the third inner case 32 covers the third antenna element 33a, the third antenna substrate 33b, the third ground plate 33c, the third shield cover 33d, the third connector 38b, the third wall portion 361, and the third camera 38a.

The third pad 34 is sandwiched between the third resin base 36 and the third inner case 32. The third seal member 40a is sandwiched between the third inner case 32 and the lens cover 32b. As a result, a watertight structure is formed between the third resin base 36 and the third inner case 32 and between the third inner case 32 and the lens cover 32b, and the third antenna element 33a and other components housed in the internal space can be waterproofed.

The ring-shaped third waterproof seal 40b is provided on a lower surface of the third flat surface portion 362. The third waterproof seal 40b is used as a water seal packing around a roof opening 101.

A third mounting member 37a of the third metal base 37, the third antenna cable 39a, and the third camera cable 39b pass through the inside of the ring constituting the third waterproof seal 40b.

The third waterproof seal 40b is sandwiched between the third flat surface portion 362 and the roof 100 of the vehicle. As a result, a watertight structure is formed between the third flat surface portion 362 and the roof 100 of the vehicle, and water can be prevented from entering the roof opening 101.

The configuration of the third metal base 37 is similar to the configuration of the second metal base 27 of the second embodiment.

The third camera 38a is arranged such that the imaging area of the image sensor of the third camera 38a faces the rear of the vehicle.

The third camera 38a includes an image sensor such as CMOS and a lens.

The lens of the third camera 38a guides external light to the imaging area of the image sensor of the third camera 38a.

The light from said rear is incident on the lens of the third camera 38a through the third camera opening 31a, the lens cover 32b, and the fourth camera opening 32a.

The light incident on the lens of the third camera 38a is recorded by the image sensor of the third camera 38a as an image signal.

The image signal obtained by the third camera 38a may correspond to a moving image or a still image.

The housing that holds the circuit board and the image sensor of the third camera 38a is made of metal (e.g., aluminum) that also serves as a shielded conductor.

Note, however, that in the third embodiment, the third camera 38a is housed in the space waterproofed by the third inner case 32, the lens cover 32b, and the third resin base 36. Hence, the housing of the third camera 38a does not need to have a waterproof structure.

The configuration of the third connector 38b is similar to the configuration of the second connector 28b of the second embodiment.

The configuration of the third camera cable 39b is similar to the configuration of the second camera cable 29b of the second embodiment.

The roof opening 101 is provided in the roof 100 of the vehicle. The third mounting member 37a provided on the third metal base 37, the third antenna cable 39a, and the third camera cable 39b pass through the roof opening 101.

The third antenna device 3 for the vehicle including the third metal base 37 is fixed to an upper surface of the roof 100 by using the third mounting member 37a.

Next, a procedure of attaching the third antenna unit 33 to the third resin base 36 and attaching the third camera 38a to the third resin base 36 will be described.

The third antenna cable 39a is attached to the third antenna unit 33 in advance.

The third camera cable 39b is attached to the third connector 38b in advance.

The third camera 38a is separated from the third connector 38b.

The third metal base 37 is fixed on the third resin base 36 with screws.

From above, the third antenna cable 39a and the third camera cable 39b are passed through a third metal base opening 37b.

After that, the third antenna unit 33 is fixed to the third flat surface portion 362 of the third resin base 36 with screws.

The third camera 38a is fixed to a rear surface portion of the third wall portion 361 with screws.

When the third camera 38a is fixed to the third wall portion 361, the third camera 38a and the third connector 38b are connected.

As a result, the third camera 38a and the third connector 38b are attached to the third resin base 36 with the third camera 38a and the third connector 38b sandwiching the third wall portion 361.

Note that the attachment of the third antenna unit 33 to the third resin base 36 may be performed before or after the attachment of the third camera 38a to the third resin base 36.

When fixing the third camera 38a to a member different from the antenna base such as the third inner case 32, it is necessary to perform a work of wiring the third camera cable 39b between the third inner case 32 and the antenna base.

In the third embodiment, the third camera 38a is fixed to the third resin base 36.

At this time, there is no need to wire the third camera cable 39b between a member different from the third resin base 36 and the third resin base 36.

For this reason, as compared with a form in which the third camera 38a is fixed to a member different from the antenna base, wiring work of the third camera cable 39b can be simplified, for example, and assembly of the third antenna device 3 for the vehicle can be facilitated.

Additionally, the third camera 38a is attached to a region (third wall portion 361) of the third resin base 36 which is raised in direction z.

The third connector 38b is arranged on the front side of the third wall portion 361. The third camera 38a is arranged on the rear side of the third wall portion 361. The third connector 38b and the third camera 38a are connected so that the third connector 38b and the third camera 38a sandwich the third wall portion 361, and the third camera 38a is attached to the third wall portion 361 with screws. This completes the fixing of the third camera 38a to the third resin base 36.

A direction in which the third wall portion 361 is sandwiched between the third camera 38a and the third connector 38b is parallel to a direction in which the third camera 38a applies a force on the third wall portion 361 with screws.

For this reason, wiring and camera attachment can be performed in a series of operations. As compared with a form in which the third camera 38a is attached to a flat shape portion of the third resin base 36, the number of man-hours is small, and assembly of the third antenna device 3 for the vehicle can be facilitated.

Additionally, as compared with a form in which the third connector 38b and the third camera 38a are connected and then the third camera cable 39b is pulled to the third metal base opening 37b side to fix the third camera 38a, the step of pulling the third camera cable 39b to the third metal base opening 37b side can be omitted. For this reason, the number of man-hours is small, and assembly of the third antenna device 3 for the vehicle can be facilitated.

Additionally, the third camera 38a can be attached at a high position. For this reason, as compared with a form in which the third camera 38a is attached to a flat shape portion of the third resin base 36, it is possible to wire the third camera cable 39b below the third resin base 36 without largely bending the third camera cable 39b. Since the third camera cable 39b does not need to be bent largely, it is possible to curb damage such as disconnection of the third camera cable 39b.

In the third embodiment, while waterproofing with the third resin base 36 and the lens cover 32b, the third inner case 32 covers the third antenna element 33a, the third antenna substrate 33b, the third connector 38b, and the third camera 38a.

As a result, as compared with a form in which the third inner case 32 does not cover the third connector 38b and the third camera 38a but covers the third antenna element 33a and the third antenna substrate 33b, and a form in which the third inner case 32 does not cover the third camera 38a but covers the third antenna element 33a, the third antenna substrate 33b, and the third connector 38b, it is possible to increase the length of the third inner case 32 in direction x.

Hence, it is possible to increase the degree of freedom in arranging the third antenna element 33a inside the third inner case 32.

Note that the third metal base 37 may form a part of the third resin base 36 (part of third wall portion 361 or part of third flat surface portion 362).

Specifically, a form is considered that the member corresponding to the third metal base 37 is also made of resin and is integrally formed with the third resin base 36.

Additionally, the form has been described in which the lens cover 32b is attached to the third inner case 32 with the third seal member 40a interposed therebetween. However, a form may be adopted in which at least a part of the lens of the third camera 38a is attached to the third inner case 32 with the third seal member 40a interposed therebetween.

Note that in the first to third embodiments, the antenna element is arranged on the front side in direction x and the camera is arranged on the rear side in direction x. However, the positional relationship between the antenna element and the camera is not limited to this.

For example, the antenna element may be arranged on the rear side in direction x, and the camera whose imaging area of the image sensor faces the front of the vehicle may be arranged on the front side in direction x.

While some embodiments of the present invention have been described, these embodiments are presented as examples and are not intended to limit the scope of the invention. These embodiments can be implemented in various other forms, and various omissions, replacements, and changes can be made without departing from the gist of the invention. These embodiments and modifications thereof are included in the invention described in the claims and equivalents thereof as well as in the scope and the gist of the invention.

REFERENCE SIGNS LIST 1 first antenna device for vehicle
11 first antenna case
11a first camera opening
12 first inner case
13 first antenna unit
13a first antenna element
13b first antenna substrate
13c first ground plate
13d first shield cover
14 first pad
141 first through hole
16 first resin base
16a mounting member provided on resin base
161 first wall portion
161a first camera mounting opening
161b lower opening
162 first flat surface portion 163 cable hole
17 first metal base
17a first mounting member
17b first metal base opening
18a first camera
18b first connector
19a first antenna cable
19b first camera cable
20a first seal member
20b first waterproof seal
2 second antenna device for vehicle
21 second antenna case
21a second camera opening
22 second inner case
23 second antenna unit
23a second antenna element
23b second antenna substrate
23c second ground plate
23d second shield cover
24 second pad
241 Second through hole
24a outer pad
24b inner pad
26 second resin base
261 second wall portion
261a second camera mounting opening
262 second flat surface portion
27 second metal base
27a second mounting member
27b second metal base opening
28a second camera
28b second connector
29a second antenna cable
29b second camera cable
30a second seal member
30b second waterproof seal
3 third antenna device for vehicle
31 third antenna case
31a third camera opening
32 third inner case
32a fourth camera opening
32b lens cover
33 third antenna unit
33a third antenna element
33b third antenna substrate
33c third ground plate
33d third shield cover
34 third pad
36 third resin base
361 third wall portion
361a third camera mounting opening
362 third flat surface portion
37 third metal base
37a third mounting member
37b third metal base opening
38a third camera
38b third connector
39a third antenna cable
39b third camera cable
40a third seal member
40b third waterproof seal
100 vehicle roof
101 roof opening

The invention claimed is:

1. An antenna device for a vehicle comprising:
an antenna case that has a housing space formed therein;
an antenna base that is covered with the antenna case from above to form the housing space;
an antenna element that is held by the antenna base and housed in the housing space; and
a camera that is housed in the housing space, wherein
the antenna base has a wall portion extending upward,
the camera is fixed to the wall portion,
the wall portion has a height that decreases in a slope shape in a direction from the camera toward the wall portion,
the antenna device further comprises an inner case that is arranged in the housing space and covers the wall portion from above to form an internal space, and
the antenna element is arranged in the internal space.

2. An antenna device for a vehicle comprising:
an antenna case that has a housing space formed therein;
an antenna base that is covered with the antenna case from above to form the housing space;
an antenna element that is held by the antenna base and housed in the housing space; and
a camera that is housed in the housing space, wherein
the antenna base has a wall portion extending upward,
the camera is fixed to the wall portion,
the antenna device further comprises an inner case that is arranged in the housing space and forms an internal space with the antenna base, and
at least a part of a lens that covers an opening of the inner case and guides external light to an imaging area of the camera, or a lens cover that protects the lens maintain watertightness with the inner case.

* * * * *